(12) United States Patent
Kojima et al.

(10) Patent No.: US 11,402,027 B2
(45) Date of Patent: Aug. 2, 2022

(54) FLUID PRESSURE CONTROL DEVICE

(71) Applicant: KYB Corporation, Tokyo (JP)

(72) Inventors: Masanari Kojima, Kanagawa (JP); Masayuki Nakamura, Kanagawa (JP); Takeshi Terao, Kanagawa (JP)

(73) Assignee: KYB CORPORATION, Tokyo (JP)

( * ) Notice: Subject to any disclaimer, the term of this patent is extended or adjusted under 35 U.S.C. 154(b) by 33 days.

(21) Appl. No.: 16/623,014

(22) PCT Filed: Sep. 28, 2018

(86) PCT No.: PCT/JP2018/036403
§ 371 (c)(1),
(2) Date: Dec. 16, 2019

(87) PCT Pub. No.: WO2019/138611
PCT Pub. Date: Jul. 18, 2019

(65) Prior Publication Data
US 2020/0332907 A1 Oct. 22, 2020

(30) Foreign Application Priority Data
Jan. 12, 2018 (JP) .............................. JP2018-003644

(51) Int. Cl.
| | | |
|---|---|---|
| *F16K 11/07* | (2006.01) | |
| *F15B 13/04* | (2006.01) | |
| *E02F 9/22* | (2006.01) | |
| *F16K 3/26* | (2006.01) | |

(52) U.S. Cl.
CPC ...... *F16K 11/0716* (2013.01); *F15B 13/0402* (2013.01); *E02F 9/2267* (2013.01); *F15B 2211/329* (2013.01); *F15B 2211/50518* (2013.01); *F16K 3/26* (2013.01)

(58) Field of Classification Search
CPC .............. F16K 11/0716; F15B 13/0402; F15B 13/0403; F15B 2211/351; F15B 2211/353
See application file for complete search history.

(56) References Cited

U.S. PATENT DOCUMENTS 5,433,076 A 7/1995 Sugiyama et al.

FOREIGN PATENT DOCUMENTS

| | | |
|---|---|---|
| JP | S52-5310 Y1 | 2/1977 |
| JP | S58-177661 U | 11/1983 |
| JP | S60-96397 U | 7/1985 |
| JP | H06-137304 A | 5/1994 |
| JP | H08135602 A | 5/1996 |
| JP | H08-326936 A | 12/1996 |
| JP | H10-184603 A | 7/1998 |
| JP | 2006009822 A | 1/2006 |

*Primary Examiner* — Daphne M Barry
(74) *Attorney, Agent, or Firm* — Rabin & Berdo, P.C.

(57) ABSTRACT

A fluid pressure control device includes a neutral passage, a control valve provided in the neutral passage, a first supply passage, and a discharge passage, the control valve has, a switching valve configured to control a flow of a working fluid to the discharge passage from the first actuator in accordance with a pressure in a pilot chamber to which a part of the working fluid supplied from the first supply passage to the first actuator is led, and a throttle portion configured to throttle the flow of the working fluid supplied to the first actuator from the first supply passage, and the pressure on an upstream side of the throttle portion is led to the pilot chamber.

5 Claims, 3 Drawing Sheets

FLUID PRESSURE CONTROL DEVICE

TECHNICAL FIELD

The present invention relates to a fluid pressure control device.

BACKGROUND ART

JPH8-326936A discloses a fluid pressure control device that drives a tilt cylinder of a fork lift. This fluid pressure control device includes a fluid control valve which connects the tilt cylinder to a parallel passage to which a high-pressure discharged liquid from a pump is led. When the fluid control valve is switched to a tilt-down position, the discharged fluid from the pump is supplied to the tilt cylinder through the parallel passage.

Moreover, in the fluid pressure control device disclosed in JPH8-326936A, a switching valve is provided in a return passage connected to the tank. This switching valve is operated by a pressure liquid led from the parallel passage. In a state where the pump is operated and the pressure in the parallel passage is high, the pressure liquid is led to the switching valve by switching the fluid control valve to the tilt-down position, and the switching valve opens the return passage. As a result, a return liquid from the tilt cylinder is discharged to the tank, and the tilt cylinder is operated. In a state where the fluid control valve is not switched, the switching valve holds a tilt-lock position and shuts off the return passage. Thus, a return oil is not discharged from the tilt cylinder, and the tilt cylinder is not operated. That is, the tilt cylinder is brought into a locked state, and the tilt cylinder is not operated even if the fluid control valve is switched to the tilt-down position by a misoperation.

SUMMARY OF INVENTION

In the fluid pressure control device disclosed in JPH8-326936A, the switching valve is effectively used as a tilt-lock valve which prevents misoperation caused by its own weight such as a fork since the switching valve is operated by a pilot pressure. However, when the pump is driven at a low rotation or when the working fluid that is discharged from the pump is supplied to an actuator different from the tilt cylinder with priority, the pressure in the parallel passage does not rise sufficiently, and the switching valve is continuously held at the tilt-lock position in some cases. In this case, the return passage is shut off, and even if the pump is driven and the fluid control valve is switched to the tilt-down position, the tilt cylinder is not operated.

As described above, in the fluid pressure control device disclosed in JPH8-326936A, even though the fluid pressure control device is operated so as to operate the tilt cylinder, the tilt cylinder cannot be operated in some cases, and stability of the operation of the fluid pressure control device is low.

The present invention has an object to improve stability of the operation of the fluid pressure control device.

According to one aspect of the present invention, a fluid pressure control device, a fluid pressure control device includes a neutral passage connecting a pump and a tank, a control valve provided in the neutral passage and configured to control an operation of a first actuator, a first supply passage branching from the neutral passage and connected to the control valve, and a discharge passage connecting the control valve and the tank, wherein the control valve has a switching valve configured to control a flow of a working fluid to the discharge passage from the first actuator in accordance with a pressure in a pilot chamber to which a part of the working fluid supplied from the first supply passage to the first actuator is led, and a throttle portion configured to throttle the flow of the working fluid supplied to the first actuator from the first supply passage, and the pressure on an upstream side of the throttle portion is led to the pilot chamber.

DESCRIPTION OF EMBODIMENTS

Hereinafter, fluid pressure control device 100, 200 according to embodiments of the present invention will be described by referring to the attached drawings.

First Embodiment

First, the fluid pressure control device 100 according to a first embodiment of the present invention will be described by referring to FIGS. 1 and 2. The fluid pressure control device 100 is provided on a fork lift 1000, for example.

Figure 1:
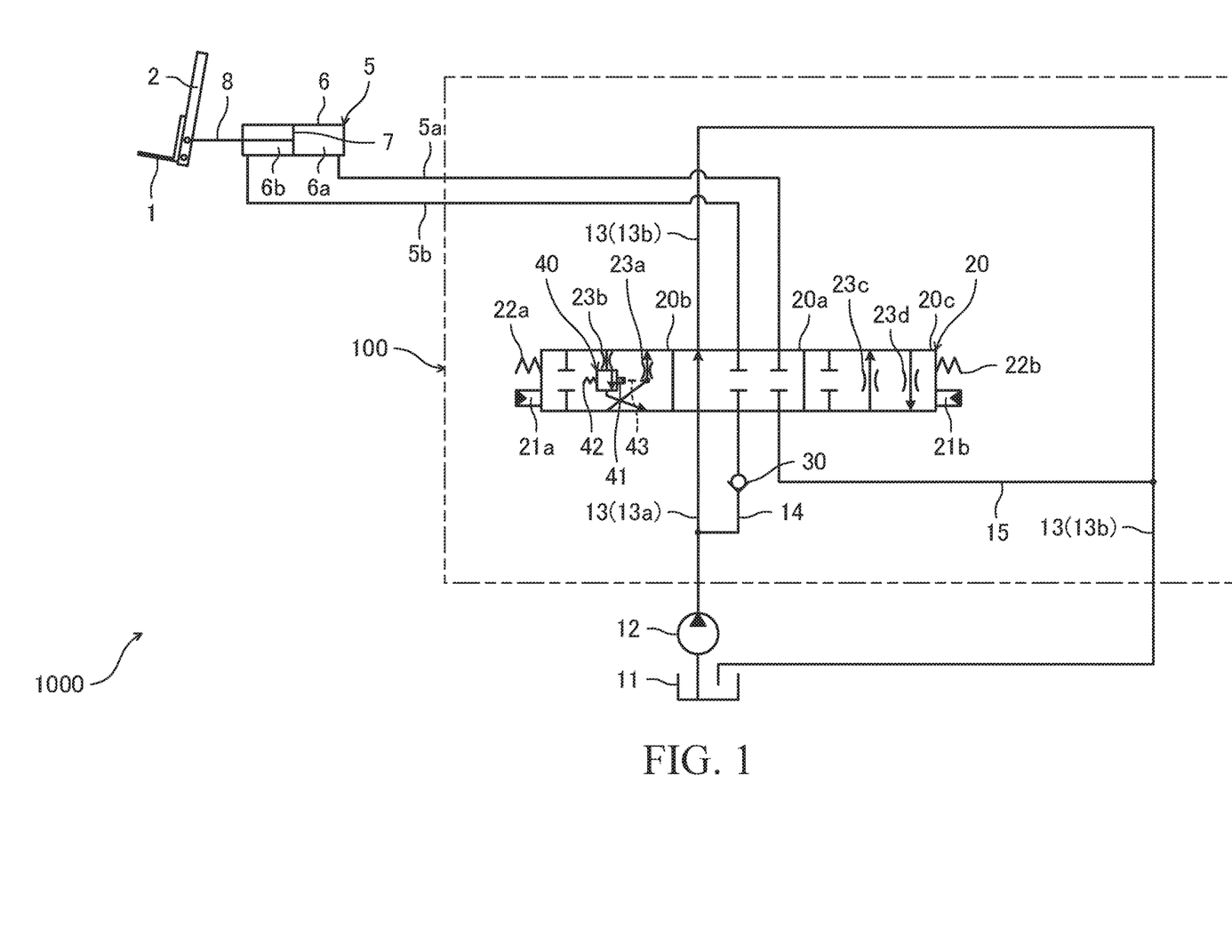
FIG. 1 is a circuit diagram of a fluid pressure control device according to a first embodiment of the present invention.

As illustrated in FIG. 1, the fork lift 1000 includes a pair of forks 1, a mast 2 that guides elevation up/down of the pair of forks 1, a tilt cylinder (first actuator) 5 that tilts the mast 2, and the fluid pressure control device 100 that controls an operation of the tilt cylinder 5. The pair of forks 1 is provided on the mast 2, capable of mounting a load. The mast 2 is supported on a front part of a vehicle-body frame (not shown), capable of being tilted. The fork 1 is tilted with respect to a horizontal axis with tilting of the mast 2.

The fork lift 1000 may include a lift cylinder (not shown) that elevates up/down the pair of forks 1 and a fork positioner (not shown) that adjusts an interval between the pair of forks 1. The fluid pressure control device 100 may control an operation of an actuator such as the lift cylinder and the fork positioner.

The tilt cylinder 5 has a cylinder tube 6, a piston 7 accommodated in the cylinder tube 6, and a piston rod 8 connected to the piston 7. The cylinder tube 6 is connected to a vehicle-body frame (not shown) of the fork lift 1000, and the piston rod 8 is connected to the mast 2. When the tilt cylinder 5 is extended, the mast 2 is tilted to the vehicle-body frame so as to lower a distal end of the fork 1. When the tilt cylinder 5 is contracted, the mast 2 is tilted to the vehicle-body frame so as to raise the distal end of the fork 1.

In the following, the tilting of the mast 2 so that the distal end of the fork 1 is lowered is called "front tilting", while the tilting of the mast 2 so that the distal end of the fork 1 is raised is called "rear tilting".

An anti-rod side chamber 6a of the tilt cylinder 5 is connected to the fluid pressure control device 100 through a first main passage 5a, and a rod side chamber 6b is connected to the fluid pressure control device 100 through a second main passage 5b. When a working oil (working fluid) is supplied from the fluid pressure control device 100 to the anti-rod side chamber 6a, and the working oil is discharged from the rod-side chamber 6b, the tilt cylinder 5 is extended and tilts the mast 2 forward. When the working oil is supplied from the fluid pressure control device 100 to the rod side chamber 6b, and the working oil is discharged from the anti-rod side chamber 6a, the tilt cylinder 5 is contracted and tilts the mast 2 rearward.

The fluid pressure control device 100 includes a tank 11 that stores the working oil, a pump 12 that pumps the working oil from the tank 11 and that discharges the working oil, and a neutral passage 13 that connects the pump 12 to the tank 11. The pump 12 is driven by a driving source (not shown) such as an engine and a motor. In a state where the neutral passage 13 is open, the working oil that is discharged from the pump 12 is discharged to the tank 11 through the neutral passage 13.

Moreover, the fluid pressure control device 100 includes a control valve 20 provided in the neutral passage 13, a supply passage (first supply passage) 14 branching from an upstream side of the control valve 20 in the neutral passage 13, and a discharge passage 15 that connects the control valve 20 to the tank 11. The control valve 20 controls a flow of the working oil in the neutral passage 13 and controls an operation of the tilt cylinder 5 by controlling the flow of the working oil supplied to/discharged from the tilt cylinder 5.

In the following, the upstream side of the control valve 20 in the neutral passage 13 is also called an "upstream-side neutral passage 13a", and a downstream side of the control valve 20 in the neutral passage 13 is also called a "downstream-side neutral passage 13b".

The working oil from the pump 12 is led to the supply passage 14 through the upstream-side neural passage 13a. A check valve 30 is provided in the supply passage 14, and the flow of the working oil from the upstream-side neutral passage 13a toward the control valve 20 through the supply passage 14 is allowed by the check valve 30, while the flow of the working oil from the control valve 20 toward the upstream-side neutral passage 13a through the supply passage 14 is shut off.

The discharge passage 15 is connected to the downstream-side neutral passage 13b. The working oil from the tilt cylinder 5 is discharged to the tank 11 through the control valve 20, the discharge passage 15, and the downstream-side neutral passage 13b. The discharge passage 15 may be directly connected to the tank 11 without pathing through the downstream-side neutral passage 13b.

The control valve 20 has a neutral position 20a, a first operation position 20b, and a second operation position 20c. Pilot chambers 21a and 21b are provided on the control valve 20, and the control valve 20 is operated by a pilot pressure led to the pilot chambers 21a and 21b.

Specifically, when the pilot pressure is supplied to the pilot chamber 21a from a hydraulic source (not shown), the pressure in the pilot chamber 21a rises, and the control valve 20 is switched to the first operation position 20b against a biasing force of a centering spring 22b. When the pilot pressure is supplied from the hydraulic source to the pilot chamber 21b, the pressure in the pilot chamber 21b rises, and the control valve 20 is switched to the second operation position 20c against the biasing force of the centering spring 22a. When the supply of the pilot pressure to the pilot chambers 21a and 21b is shut off, the pressures in the pilot cambers 21a and 21b become a tank pressure. As a result, the control valve 20 is held at the neutral position 20a by the biasing forces of the centering springs 22a and 22b.

At the neutral position 20a, the control valve 20 opens the neutral passage 13 and shuts off the flow of the working oil in the supply passage 14 and the discharge passage 15. At this time, since the working oil from the pump 12 is not supplied to the rod side chamber 6b and the anti-rod side chamber 6a of the tilt cylinder 5, the tilt cylinder 5 is not operated, and the mast 2 is held at a predetermined tilting angle.

At the second operation position 20c, the control valve 20 shuts off the neutral passage 13, and allows the supply passage 14 to communicate with the rod side chamber 6b of the tilt cylinder 5 and allows the anti-rod side chamber 6a to communicate with the discharge passage 15. Thus, the working oil from the pump 12 is supplied to the rod side chamber 6b through the upstream-side neutral passage 13a, the supply passage 14, and the second main passage 5b, while the working oil in the anti-rod side chamber 6a is discharged to the tank 11 through the first main passage 5a, the discharge passage 15, and the downstream-side neutral passage 13b. As a result, the tilt cylinder 5 is contracted, and the mast 2 is tilted rearward. In the following, the second operation position 20c is also called a "rear tilting position".

The control valve 20 has a throttle portion 23c that throttles the flow of the working oil led from the supply passage 14 to the rod side chamber 6b of the tilt cylinder 5 and a throttle portion 23d that throttles the flow of the working oil led to the discharge passage 15 from the anti-rod side chamber 6a at the rear tilting position 20c. Therefore, rapid rear tilting of the mast 2 can be prevented, and a rear tilting speed of the mast 2 can be relaxed.

At the first operation position 20b, the control valve 20 shuts off the neutral passage 13 and allows the supply passage 14 and the anti-rod side chamber 6a to communicate. Thus, the working oil from the pump 12 is supplied to the anti-rod side chamber 6a through the upstream-side neutral passage 13a, the supply passage 14 and the first main passage 5a. At this time, when the working oil in the rod-side chamber 6b is discharged to the tank 11, the tilt cylinder 5 is extended, and the mast 2 is tilted forward. In the following, the first operation position 20b is also called a "front tilting position".

The control valve 20 has a switching valve 40 that controls the flow of the working oil from the rod side chamber 6b of the tilt cylinder 5 to the discharge passage 15 at the front tilting position 20b. The working oil in the rod side chamber 6b is discharged to the tank 11 in a flowrate according to an opening characteristic of the switching valve 40, when the control valve 20 is switched to the front tilting position 20b and the switching valve 40 is switched to a communication position which will be described later where the rod side chamber 6b communicates with the discharge passage 15. As a result, the tilt cylinder 5 is extended, and the mast 2 is tilted forward.

The switching valve 40 is provided with a pilot chamber 41 to which the working oil that is supplied from the supply passage 14 to the anti-rod side chamber 6a of the tilt cylinder 5 is led through a pilot passage 43. When the control valve 20 is switched to the front tilting position 20b, and the working oil is led to the pilot chamber 41, the switching valve 40 is switched to the communication position against the biasing force of a spring (biasing member) 42. When the control valve 20 is switched to the neutral position 20a or to the rear tilting position 20c, and supply of the working oil to the pilot chamber 41 is shut off, the switching valve 40 is switched to a shut-off position by the biasing force of the spring 42.

As described above, in the fluid pressure control device 100, the working oil in the rod side chamber 6b of the tilt cylinder 5 is led to the discharge passage 15 through the switching valve 40 and is discharged to the tank 11, when the control valve 20 is switched to the front tilting position 20b. Therefore, the flowrate of the working oil that is discharged from the rod side chamber 6b to the tank 11 can be adjusted by the switching valve 40 as will be described later, and the front tilting speed of the mast 2 can be adjusted.

Moreover, the control valve 20 further has a throttle portion 23a that throttles the flow of the working oil led to the anti-rod side chamber 6a of the tilt cylinder 5 from the supply passage 14 and a throttle portion 23b that throttles the flow of the working oil led to the discharge passage 15 from the rod side chamber 6b at the front tilting position 20b. Rapid front tilting of the mast 2 can be prevented by the throttle portions 23a and 23b, and the front tilting speed of the mast 2 can be relaxed.

The pilot passage 43 is connected to an upstream side of the throttle portion 23a, and the pressure of the throttle portion 23a on the upstream side is led to the pilot chamber 41. Thus, even if the flowrate of the working oil led to the supply passage 14 from the pump 12 is small, the pressure in the pilot chamber 41 rises, and the switching valve 40 is switched to the communication position. Therefore, the working oil can be discharged to the tank 11 from the rod side chamber 6b of the tilt cylinder 5 through the switching valve 40 and the discharge passage 15, and the tilt cylinder 5 can be extended, and the mast 2 can be tilted forward.

As described above, in the fluid pressure control device 100, even if the flowrate of the working oil discharged from the pump 12 is small, the tilt cylinder 5 can be operated by switching the switching valve 40 by switching of the control valve 20. Therefore, stability of the operation of the fluid pressure control device 100 can be improved.

Figure 2:
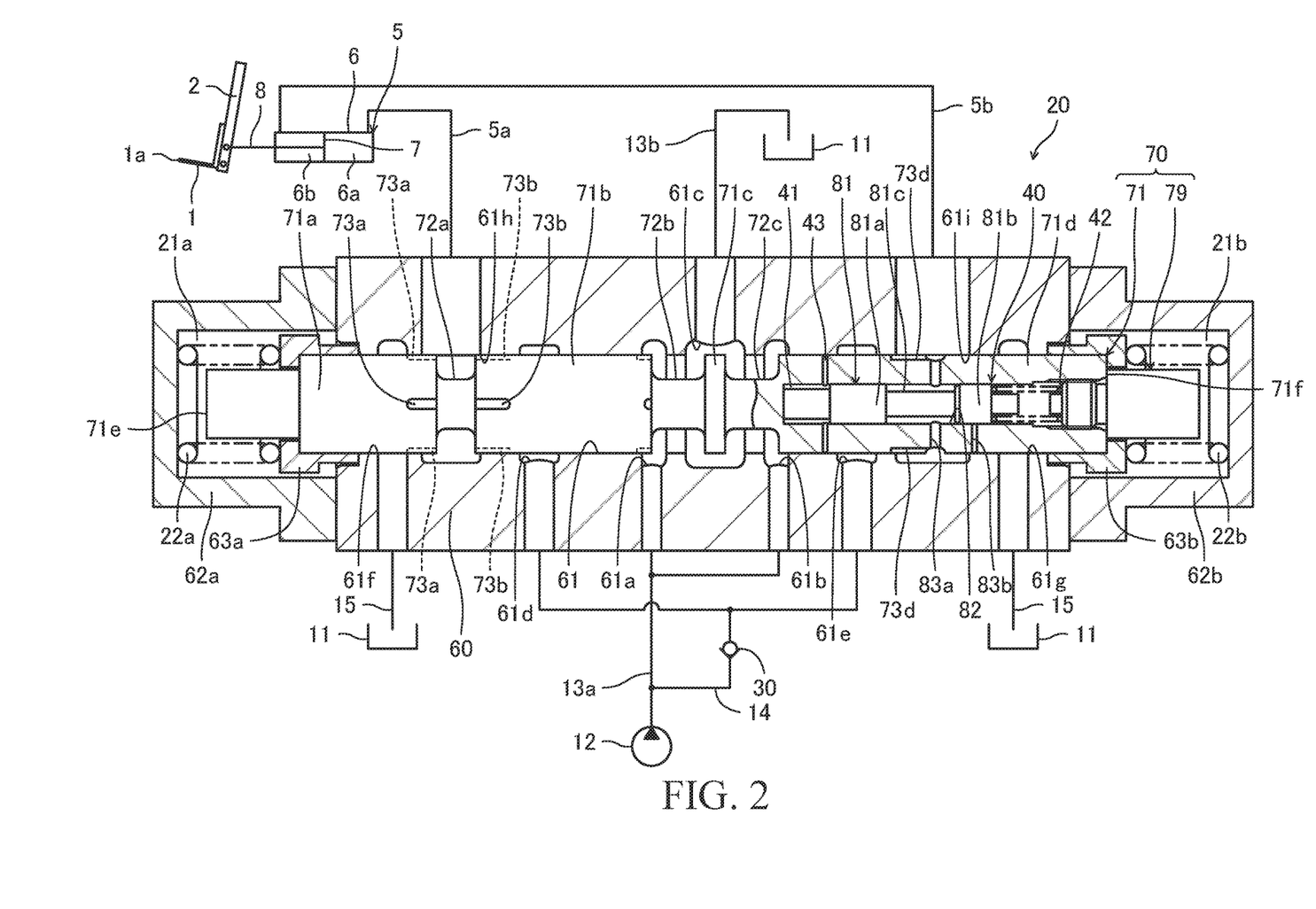
FIG. 2 is a sectional view of a control valve and illustrates a state at a neutral position.

FIG. 2 is a sectional view of the control valve 20 and illustrates a state where the control valve 20 is at the neutral position 20a. The control valve 20 has a housing 60 having a hole 61 and a main spool 70 slidably accommodated in the hole 61 in an axial direction. One of openings of the hole 61 is closed by a cap 62a having a bottomed cylindrical shape, while the other opening is closed by a cap 62b having a bottomed cylindrical shape. The caps 62a and 62b are mounted on the housing 60 by bolts (not shown). The pilot chambers 21a and 21b of the control valve 20 are formed by the caps 62a and 62b, respectively.

An inner peripheral surface of the hole 61 in the housing 60 is formed with upstream-side neutral ports 61a and 61b connected to the upstream-side neutral passage 13a, a downstream-side neutral port 61c connected to the downstream-side neutral passage 13b, first and second supply ports 61d and 61e connected to the supply passage 14, first and second discharge ports 61f and 61g connected to the discharge passage 15, a first main port 61h connected to the first main passage 5a, and a second main port 61i connected to the second main passage 5b.

The main spool 70 has a spool body 71 inserted into the hole 61 and a plug 79 mounted on the spool body 71. One end portion 71e of the spool body 71 is accommodated in the cap 62a. The plug 79 is mounted on the other end portion 71f of the spool body 71 and is accommodated in the cap 62b. The one end portion 71e of the spool body 71 is faced with the pilot chamber 21a, and the plug 79 is faced with the pilot chamber 21b.

Since the one end portion 71e of the spool body 71 is accommodated in the cap 62a, movement of the main spool 70 to a direction of reducing the pilot chamber 21a of the control valve 20 is limited by the cap 62a. Since the plug 79 of the main spool 70 is accommodated in the cap 62b, the movement of the main spool 70 to the direction of reducing the pilot chamber 21b of the control valve 20 is limited by the cap 62b. That is, the caps 62a and 62b function as limiting portions that limit the movement of the main spool 70 in the direction of reducing the pilot chamber 21a and the pilot chamber 21b, respectively.

A spring receiver 63a is accommodated in the cap 62a, and a spring receiver 63b is accommodated in the cap 62b. A hole is formed in the spring receiver 63a, and one end portion 71e of the spool body 71 is inserted through this hole. Similarly, a hole is formed in the spring receiver 63b, and the plug 79 of the main spool 70 is inserted through this hole.

The centering spring 22a is provided in a state compressed between a bottom portion of the cap 62a and the spring receiver 63a and biases the main spool 70 to a direction (right direction in FIG. 2) of enlarging the pilot chamber 21a and of reducing the pilot chamber 21b. When the pilot pressure is led to the pilot chamber 21b, the main spool 70 is moved to a direction (left direction in FIG. 2) of reducing the pilot chamber 21a against the biasing force of the centering spring 22a. As a result, the control valve 20 is switched to the rear tilting position 20c.

The centering spring 22b is provided in a state compressed between a bottom portion of the cap 62b and the spring receiver 63b and biases the main spool 70 to the direction (the left direction in FIG. 2) of enlarging the pilot chamber 21b and of reducing the pilot chamber 21a. When the pilot pressure is led to the pilot chamber 21a, the main spool 70 is moved to a direction (the right direction in FIG. 2) of reducing the pilot chamber 21b against the biasing force of the centering spring 22b. As a result, the control valve 20 is switched to the front tilting position 20b.

The spool body 71 has first, second, third, and fourth land portions 71a, 71b, 71c, and 71d in sliding contact with an inner peripheral surface of the hole 61 of the housing 60. The first, second, third, and fourth land portions 71a, 71b, 71c, and 71d are formed from the one end portion 71e toward the other end portion 71f of the spool body 71 in this order at intervals.

A first annular groove 72a is formed between the first land portion 71a and the second land portion 71b. Similarly, a second annular groove 72b is formed between the second land portion 71b and the third land portion 71c, and a third annular groove 72c is formed between the third land portion 71c and the fourth land portion 71d.

On outer peripheries of the first, second, and fourth land portions 71a, 71b, and 71d, a plurality of notches 73a, 73b, and 73d are formed, respectively. Each of the notches 73a, 73b, and 73d extends to an axial direction of the main spool 70.

The switching valve 40 is provided on the main spool 70 of the control valve 20. Specifically, a hole portion 82 is formed in the axial direction in the fourth land portion 71d of the spool body 71, and a sub-spool 81 is slidably inserted in the axial direction of the hole portion 82. That is, the spool body 71 of the control valve 20 functions as a housing of the switching valve 40.

The hole portion 82 is opened in an end surface of the spool body 71, and the opening of the hole portion 82 is closed by the plug 79. The plug 79 is fixed to the spool body 71 by screwing with a female screw formed on an inner periphery of the hole portion 82.

The sub-spool 81 has first and second land portions 81a and 81b in sliding contact with an inner peripheral surface of the hole portion 82 and an annular groove 81c formed between the first and second land portions 81a and 81b. The pilot chamber 41 is defined in the hole portion 82 by the first land portion 81a. The pilot chamber 41 communicates with the second supply port 61e through the pilot passage 43 in accordance with the movement of the main spool 70. The spring 42 is provided in a state compressed between the second land portion 81b and the plug 79 and biases the sub-spool 81 to the direction of reducing the pilot chamber 41.

The fourth land portion 71d of the spool body 71 is formed with a first sub-passage 83a that communicates with the second main port 61i at all times and a second sub-passage 83b connected to the second discharge port 61g in accordance with the movement of the main spool 70. The first sub-passage 83a and the second sub passage 83b are holes penetrating between an outer peripheral surface of the fourth land portion 71d and an inner peripheral surface of the hole portion 82.

As described above, the pilot chamber 41 of the switching valve 40, the sub-spool 81, and the first and second sub-passages 83a and 83b are provided in the main spool 70. Thus, by assembling the main spool 70 in the housing 60 of the control valve 20, the switching valve 40 can be assembled in the control valve 20. Therefore, the fluid pressure control device 100 can be manufactured easily.

Subsequently, an operation of the fluid pressure control device 100 will be described by referring to FIGS. 1 and 2.

First, a case where the control valve 20 is at the neutral position 20a will be described.

In a state where the pilot pressure is not supplied to the pilot chambers 21a and 21b of the control valve 20, the main spool 70 of the control valve 20 is held at the neutral position 20a illustrated in FIGS. 1 and 2 by the biasing force of the centering springs 22a and 22b. At this time, the working oil that is discharged from the pump 12 is discharged to the tank 11 through the neutral passage 13.

The communication between the first supply port 61d and the first main port 61h is shut off by the second land portion (land portion) 71b, and the communication between the second supply port 61e and the second main port 61i is shut off by the fourth land portion 71d. Thus, the working oil from the pump 12 is led to neither of the anti-rod side chamber 6a nor the rod side chamber 6b of the tilt cylinder 5.

Moreover, the communication between the first main port 61h and the first discharge port 61f is shut off by the first land portion 71a, and the communication between the second main port 61i and the second discharge port 61g is shut off by the fourth land portion 71d. Thus, the working oil is discharged neither from the anti-rod side chamber 6a nor the rod side chamber 6b of the tilt cylinder 5.

Thus, since supply/discharge of the working oil to/from the anti-rod side chamber 6 and the rod side chamber 6b of the tilt cylinder 5 is not performed at the neutral position 20a, the tilt cylinder 5 is not operated.

Subsequently, a case where the control valve 20 is switched to the rear tilting position 20c, that is, a case where the pilot pressure is led to the pilot chamber 21b, and the main spool 70 is moved to the left direction in FIG. 2 will be described.

When the main spool 70 is moved to the left direction in FIG. 2, the communication between the upstream-side neutral port 61a and the downstream-side neutral port 61c is shut off by the third land portion 71c, and the communication between the upstream-side neutral port 61b and the downstream-side neutral port 61c is shut off by the fourth land portion 71d. Therefore, the communication between the upstream-side neutral passage 13a and the downstream-side neutral passage 13b in the neutral passage 13 is shut off, and the working oil that is discharged from the pump 12 is not led to the downstream-side neutral passage 13b.

The second supply port 61e and the second main port 61i communicate with each other through the notch 73d of the fourth land portion 71d, and the first main port 61h and the first discharge port 61f communicate with each other through the notch 73a of the first land portion 71a. Thus, the working oil from the pump 12 is supplied to the rod side chamber 6b of the tilt cylinder 5, and the working oil in the anti-rod side chamber 6a is discharged to the tank 11, and the tilt cylinder 5 is contracted. The notch 73d functions as the throttle portion 23c, and the notch 73a functions as the throttle portion 23d of the control valve 20.

Subsequently, a case where the control valve 20 is switched to the front tilting position 20b, that is, a case where the pilot pressure is led to the pilot chamber 21a, and the main spool 70 is moved to the right direction in FIG. 2 will be described.

When the main spool 70 is moved to the right direction in FIG. 2, the communication between the upstream-side neutral port 61a and the downstream-side neutral port 61c is shut off by the second land portion 71b, and the communication between the upstream-side neutral port 61b and the downstream-side neutral port 61c is shut off by the third land portion 71c. Therefore, the working oil that is discharged from the pump 12 is not led to the downstream-side neutral passage 13b similarly to the case where the control valve 20 is switched to the rear tilting position 20c.

The first supply port 61d and the first main port 61h communicate with each other through the notch 73b of the second land portion 71b and the first annular groove 72a, and the communication between the first main port 61h and the first discharge port 61f is shut off by the first land portion 71a. Thus, the working oil that is led to the supply passage 14 from the pump 12 is supplied to the anti-rod side chamber 6a of the tilt cylinder 5 without being led to the discharge passage 15.

Moreover, the communication between the second supply port 61e and the second main port 61i is shut off by the fourth land portion 71d. Thus, the working oil that is led to the supply passage 14 from the pump 12 is not led to the second main passage 5b and does not hinder the flow of the working oil flowing from the second main passage 5b to the discharge passage 15.

At this time, the flow of the working oil that is supplied from the supply passage 14 to the anti-rod side chamber 6a of the tilt cylinder 5 is throttled by the notch 73b. That is, the notch 73b functions as the throttle portion 23a of the control valve 20. Thus, the rapid front tilting of the mast 2 can be prevented, and the front tilting speed of the mast 2 can be relaxed.

The pressure on the upstream side of the notch 73b is led to the plot chamber 41 of the switching valve 40 through the second supply port 61e and the pilot passage 43a. Thus, even if the flowrate of the working oil that is led to the supply passage 14 from the pump 12 is small, the pressure in the pilot chamber 41 rises. As a result, the sub-spool 81 of the switching valve 40 is moved to the direction of enlarging the pilot chamber 41 against the biasing force of the spring 42.

The first sub-passage 83a and the second sub-passage 83b communicate with each other through the annular groove 81c with the movement of the sub-spool 81. Moreover, the second sub-passage 83b communicates with the second discharge port 61g with the movement of the main spool 70. Since the first sub-passage 83a communicates with the second main passage 5b at all times, the second main passage 5b communicates with the second discharge port 61g through the first sub-passage 83a, the annular groove 81c, and the second sub-passage 83b. Therefore, the working oil in the rod side chamber 6b of the tilt cylinder 5 is discharged to the tank 11 through the second main passage 5b and the discharge passage 15.

As described above, at the front tilting position 20b, the working oil that is discharged from the pump 12 is led to the anti-rod side chamber 6a of the tilt cylinder 5, and the working oil is discharged from the rod side chamber 6b to the tank 11. As a result, the tilt cylinder 5 is extended.

Moreover, an extending speed of the tilt cylinder 5, which is the front tilting speed of the mast 2, can be adjusted by the switching valve 40. In detail, the working oil of the rod side chamber 6b is discharged by communication among the second main port 61i, the first sub-passage 83a, the annular groove 81c, the second sub-passage 83b, and the second discharge port 61g. Thus, with regard to the flowrate of the working oil discharged from the rod side chamber 6b of the tilt cylinder 5 to the tank 11, a discharge flowrate of the working oil can be adjusted by adjusting timing of communication between the first sub-passage 83a and the second sub-passage 83b or the timing of communication between the second sub-passage 83b and the second discharge port 61g.

These timings can be adjusted by changing axial positions of the first sub-passage 83a or/and the second sub-passage 83b formed with respect to the spool body 71 or an axial length of the second land portion 81b of the sub-spool 81 and the like. That is, the opening characteristic with respect to the discharge of the working oil can be determined by the switching valve 40. Therefore, the opening characteristic can be easily changed by replacing the sub-spool 81 of the switching valve 40 or/and the spool body 71 functioning as the housing of the switching valve 40.

In the fluid pressure control device 100, the flow of the working oil that is supplied to the anti-rod side chamber 6a of the tilt cylinder 5 from the supply passage 14 is throttled by the notch 73b (throttle portion 23a) and thus, the pressure on the upstream side of the notch 73b rises. Since the pressure on the upstream side of the notch 73b is led to the pilot chamber 41, the pressure in the pilot chamber 41 rises with the rise of the pressure on the upstream side of the notch 73b. Thus, even if the flowrate of the working oil that is discharged from the pump 12 is small, the first sub-passage 83a and the second sub-passage 83b can be made to communicate by moving the sub-spool 81 of the switching valve 40 against the biasing force of the spring 42. Therefore, the working oil in the rod side chamber 6b of the tilt cylinder 5 can be discharged to the tank 11 through the second main passage 5b and the discharge passage 15, and the tilt cylinder 5 can be extended.

Moreover, since the notch 73b is formed in the main spool 70, the throttle portion 23a can be assembled in the housing 60 by assembling the main spool 70 in the housing 60, and the fluid pressure control device 100 can be easily manufactured. In changing a throttling characteristic of the throttle portion 23a, the main spool 70 only needs to be replaced. Therefore, the throttling characteristic of the throttle portion 23a can be easily changed.

Moreover, the flow of the working oil that is led to the anti-rod side chamber 6a of the tilt cylinder 5 from the supply passage 14 is throttled the notch 73b formed in the second land portion 71b. Therefore, fluctuation in the pressure on the upstream side of the notch 73b with displacement of the main spool 70 can be reduced, and a state where the switching valve 40 causes the rod side chamber 6b of the tilt cylinder 5 and the discharge passage 15 to communicate can be held. As a result, stability of the operation of the fluid pressure control device 100 can be further improved.

The second sub-passage 83b of the switching valve 40 is formed so as to apply resistance to the flow of the working oil. Thus, the flow of the working oil that is led to the discharge passage 15 from the second main passage 5b is throttled by the second sub-passage 83b. That is, the second sub-passage 83b functions as the throttle portion 23b of the control valve 20.

In the fluid pressure control device 100 according to the aforementioned first embodiment, the pressure on the upstream side of the notch 73b (throttle portion 23a) is led to the pilot chamber 41. Thus, even if the flowrate of the working oil that is led to the supply passage 14 from the pump 12 is small, the pressure in the pilot chamber 41 rises, and the switching valve 40 allows the second main passage 5b to communicate with the discharge passage 15. Therefore, the tilt cylinder 5 can be operated by switching of the control valve 20, and stability of the operation of the fluid pressure control device 100 can be improved.

The pilot chamber 41, the sub-spool 81, and the spring 42 of the switching valve 40 are provided in the main spool 70. Thus, in pulling the main spool 70 out of the housing 60, the pilot chamber 41, the sub-spool 81, and the spring 42 of the switching valve 40 are removed from the housing 60 together with the notch 73b formed on the second land portion 71b of the main spool 70. Therefore, the switching valve 40 can be replaced when the throttling characteristic of the notch 73b is changed, and the fluid pressure control device 100 can be easily adjusted.

Moreover, the flowrate of the working oil that is discharged to the tank 11 from the rod side chamber 6b of the tilt cylinder 5 can be adjusted by the switching valve 40. Therefore, the front tilting speed of the mast 2 can be adjusted.

Second Embodiment

Subsequently, a fluid pressure control device 200 according to the second embodiment of the present invention will be described by referring to FIG. 3. The same reference numerals are given to the same configuration as those in the fluid pressure control device 100 according to the first embodiment, and the description will be omitted.

Figure 3:
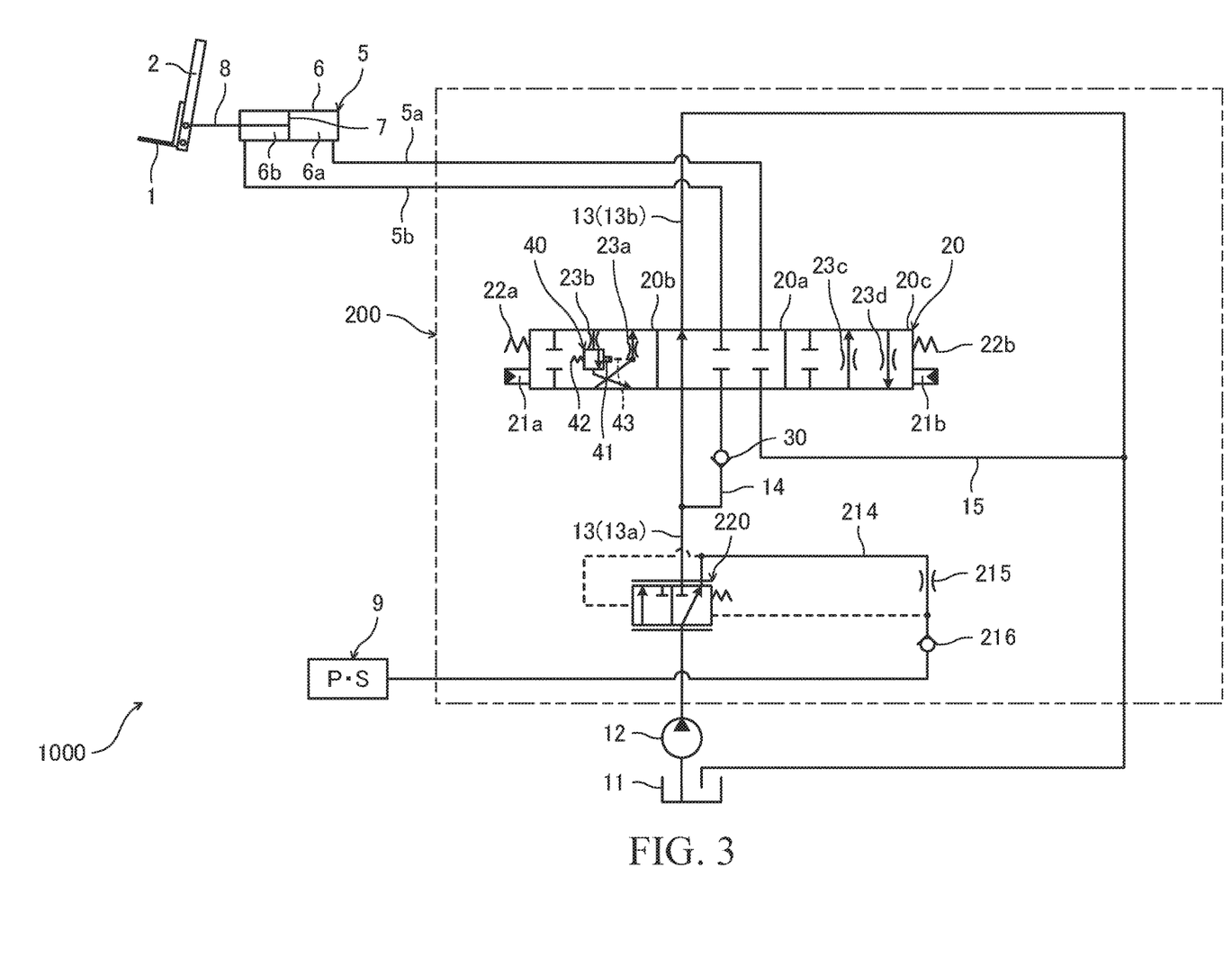
FIG. 3 is a circuit diagram of the fluid pressure control device according to a second embodiment of the present invention.

As illustrated in FIG. 3, the fluid pressure control device 200 further has a flow dividing valve 220 provided on the upstream side of a branch point from the supply passage 14 in the neutral passage 13 and a supply passage (second supply passage) 214 that connects the flow dividing valve 220 and a power steering unit (second actuator) 9.

A supply passage 214 is provided with a throttle portion 215 that throttles the flow of the working oil and a check valve 216 provided on the downstream side of the throttle portion 215. The check valve 216 allows the flow of the working oil from the flow dividing valve 220 toward the power steering unit 9, and shuts off the flow of the working oil from the power steering unit 9 toward the flow dividing valve 220.

The flow dividing valve 220 is operated so as to keep a differential pressure between the upstream side and the downstream side of the throttle portion 215 in the supply passage 214 constant. Thus, the working oil is supplied to the power steering unit 9 in a flowrate determined in advance. Therefore, even if the flowrate of the working oil that is discharged from the pump 12 is decreased, the power steering unit 9 can be operated stably.

In the fluid pressure control device 200 including such flow dividing valve 220, an excess working oil is led to the supply passage 14. Thus, if a rotation number of the pump 12 is low, the flowrate of the working oil that is led to the supply passage 14 from the pump 12 through the neutral passage 13 becomes smaller. That is, when the control valve 20 is switched to the front tilting position 20b, the flowrate of the working oil that is led to the supply passage 14 becomes much smaller.

In the fluid pressure control device 200 including such flow dividing valve 220, an excess working oil is led to the supply passage 14. Thus, if a rotation number of the pump 12 is low, the flowrate of the working oil led to the supply passage 14 from the pump 12 through the neutral passage 13 becomes smaller. That is, when the control valve 20 is switched to the front tilting position 20b, the flowrate of the working oil led to the supply passage 14 becomes much smaller.

In the fluid pressure control device 200, when the control valve 20 is switched to the front tilting position 20b, the flow of the working oil that is supplied to the anti-rod side chamber 6a of the tilt cylinder 5 from the supply passage 14 is throttled by the throttle portion 23a. Thus, even if the flowrate of the working oil in the supply passage 14 is small, the pressure in the pilot chamber 41 of the switching valve 40 can be raised. Therefore, the working oil can be discharged from the tilt cylinder 5 by switching the switching valve 40 when the control valve 20 is switched to the front tilting position 20b.

As described above, even if the working oil that is discharged from the pump 12 is led to the supply passage 214 different from the supply passage 14 with priority, stability of the operation of the fluid pressure control device 200 can be improved.

In the fluid pressure control device 200 according to the aforementioned second embodiment, the following effects are exerted in addition to the effects of the fluid pressure control device 100 according to the first embodiment.

The flow dividing valve 220 leads the working oil in the flowrate determined in advance to the supply passage 214. Thus, the working oil is supplied in the flowrate determined in advance to the power steering unit 9. Therefore, even when the flowrate of the working oil that is discharged from the pump 12 decreases, the power steering unit 9 can be operated stably. Moreover, the flow dividing valve 220 leads the excess working oil to the supply passage 14. Thus, when the control valve 20 is switched to the front tilting position 20b, the switching valve 40 is switched by the pressure of the excess working oil in the supply passage 14. Since the flow of the excess working oil is throttled by the throttle portion 23a, even if the flowrate of the excess working oil is small, the pilot pressure of the switching valve 40 is raised, and the switching valve 40 is switched to the communication position. Therefore, the working oil can be discharged from the tilt cylinder 5 by the operation of the control valve 20, and the operation of the tilt cylinder 5 can be controlled by the control valve 20.

Hereinafter, the configurations, actions, and effects of the embodiments of the present invention will be described in summary.

The fluid pressure control device 100, 200 includes the neutral passage 13 connecting the pump 12 and the tank 11, the control valve 20 provided in the neutral passage 13 and configured to control the operation of the tilt cylinder 5, the supply passage 14 branching from the neutral passage 13 and connected to the control valve 20, and the discharge passage 15 connecting the control valve 20 and the tank 11, and the control valve 20 has the switching valve 40 configured to control the flow of the working oil from the rod side chamber 6b of the tilt cylinder 5 to the discharge passage 15 in accordance with the pressure of the pilot chambers 41 to which a part of the working oil supplied to the anti-rod side chamber 6a of the tilt cylinder 5 is led from the supply passage 14, and the throttle portion 23a configured to throttle the flow of the working oil supplied to the anti-rod side chamber 6a of the tilt cylinder 5 from the supply passage 14, and the pressure on the upstream side of the throttle portion 23a is led to the pilot chamber 41.

In this configuration, the pressure on the upstream side of the throttle portion 23a is led to the pilot chamber 41. Thus, even if the flowrate of the working oil that is led to the supply passage 14 from the pump 12 is small, the pressure in the pilot chamber 41 of the switching valve 40 can be raised, and the flow of the working oil to the discharge passage 15 from the anti-rod side chamber 6a of the tilt cylinder 5 can be controlled by the switching valve 40. As a result, stability of the operation of the fluid pressure control device 100, 200 can be improved.

Moreover, the fluid pressure control device 200 further includes the flow dividing valve 220 provided on the upstream side of the branch point from the supply passage 14 in the neutral passage 13 and the supply passage 214 connecting the flow dividing valve 220 and the power steering unit 9, and the flow dividing valve 220 is configured to lead the working oil in the flowrate determined in advance to the supply passage 214 and to lead the excess working oil to the neutral passage 13.

In this configuration, the flow dividing valve 220 leads the working oil in the flowrate determined in advance to the supply passage 214. Thus, the working oil in the flowrate determined in advance is supplied to the power steering unit 9. Therefore, even if the flowrate of the working oil that is discharged from the pump 12 is decreased, the power steering unit 9 can be operated stably. Moreover, the flow dividing valve 220 leads the excess working oil to the neutral passage 13. Since the flow of the working oil that is supplied to the anti-rod side chamber 6a of the tilt cylinder 5 from the neutral passage 13 through the supply passage 14 is throttled by the throttle portion 23a, even if the flowrate of the excess working oil is small, the pressure in the pilot chamber 41 of the switching valve 40 can be raised. Therefore, stability of the operation of the fluid pressure control device 200 can be improved.

Moreover, in the fluid pressure control device 100, 200, the control valve 20 has the main spool 70 slidably accommodated in the housing 60, and the main spool 70 has the second land portion 71b configured to switch between allowing and shut-off of the flow of the working oil from the supply passage 14 to the anti-rod side chamber 6a of the tilt cylinder 5 by moving in the axial direction, and the throttle portion 23a is formed on the second land portion 71b.

In this configuration, the throttle portion 23a is formed on the second land portion 71b of the main spool 70. Thus, the throttle portion 23a can be provided on the control valve 20 by assembling the main spool 70 in the housing 60. Therefore, the fluid pressure control device 100, 200 can be easily manufactured, and the throttle characteristic of the throttle portion 23a can be easily changed.

Moreover, in the fluid pressure control device 100, 200, the main spool 70 has the hole portion 82 formed in the axial direction, the sub-spool 81 slidably inserted into the hole portion 82 in the axial direction and configured to define the pilot chamber 41 in the hole portion 82, the first sub-passage 83a communicating with the rod side chamber 6b of the tilt cylinder 5 at all times, and the second sub-passage 83b connected to the discharge passage 15 in accordance with the movement of the main spool 70, and the sub-spool 81 is configured to control the communication between the first sub-passage 83a and the second sub-passage 83b in accordance with the pressure in the pilot chamber 41 communicating with the supply passage 14 in accordance with the movement of the main spool 70.

In this configuration, the pilot chamber 41 of the switching valve 40, the sub-spool 81, the first sub-passage 83a, and the second sub-passage 83b are provided in the main spool 70. Thus, the switching valve 40 can be assembled in the control valve 20 by assembling the main spool 70 in the housing 60. Therefore, the fluid pressure control device 100, 200 can be easily manufactured.

Although the embodiment of the present invention has been described above, the above embodiment is merely an illustration of one exemplary application of the present invention and is not intended to limit the technical scope of the present invention to the specific configuration of the above embodiment.

In the fluid pressure control device 100, 200 according to the aforementioned embodiments, the control valve 20 is a control valve of a so-called pilot type configured to be operated by the pilot pressure and adjusts the discharge flowrate of the working oil by the opening characteristic of the switching valve 40. This is not limiting, and the control valve 20 may be a control valve of a so-called manual type configured to be operated manually. In this case, the switching valve 40 also functions as a well-known tilt-lock in addition to the function of adjusting the discharge flowrate of the working oil.

The fluid pressure control device 100, 200 according to the aforementioned embodiments uses the working oil as a working fluid but may use a non-compressive fluid such as water, an aqueous solution or the like instead of the working oil.

In the fluid pressure control device 100, the notch 73b is formed on the second land portion 71b as the throttle portion 23a, but the throttle portion 23a may be in a form other than the notch such as an orifice passage or a chalk passage, for example.

The present application claims a priority based on Japanese Patent Application No. 2018-3644 filed with the Japan Patent Office on Jan. 12, 2018, and all the contents of this application are incorporated herein by reference.

The invention claimed is:

1. A fluid pressure control device, comprising:
a neutral passage connecting a pump and a tank;
a control valve provided in the neutral passage and configured to control an operation of a first actuator, the control valve having a pilot chamber;
a first supply passage branching from the neutral passage at a branch point and connected to the control valve, a part of a working fluid supplied to the first actuator from the first supply passage flowing into the pilot chamber; and
a discharge passage connecting the control valve and the tank, wherein
the control valve has:
an operation position that allows a flow of the working fluid from the first supply passage to the first actuator and the pilot chamber;
a switching valve configured to control a flow of the working fluid to the discharge passage from the first actuator in accordance with a pressure in the pilot chamber; and
a throttle portion configured to throttle the flow of the working fluid supplied to the first actuator from the first supply passage, when the control valve is switched to the operation position; and
the pressure on an upstream side of the throttle portion is led to the pilot chamber.

2. The fluid pressure control device according to claim 1, further comprising:
a flow dividing valve provided at an upstream side of the branch point of the first supply passage from the neutral passage; and
a second supply passage connecting the flow dividing valve and a second actuator, wherein
the flow dividing valve is configured to lead a working fluid in a flowrate determined in advance to the second supply passage and to lead an excess working fluid to the neutral passage.

3. The fluid pressure control device according to claim 1, wherein
the control valve has a main spool slidably accommodated in a housing in an axial direction;
the main spool has a land portion configured to switch between allowing and shut-off of the flow of the working fluid from the first supply passage to the first actuator by moving in the axial direction; and
the throttle portion is formed on the land portion.

4. The fluid pressure control device according to claim 3, wherein
the main spool has:
a hole portion formed in the axial direction;
a sub-spool slidably inserted in the hole portion in the axial direction, the sub-spool being configured to define the pilot chamber in the hole portion;
a first sub-passage communicating with the first actuator at all times; and
a second sub-passage connected to the discharge passage in accordance with movement of the main spool; and
the sub-spool is configured to control communication between the first sub-passage and the second sub-passage in accordance with a pressure in the pilot chamber communicating with the first supply passage in accordance with movement of the main spool.

5. The fluid pressure control device according to claim 3, wherein the throttle portion comprises a notch formed on the land portion.

* * * * *